US010484227B2

(12) United States Patent
Tsuchida

(10) Patent No.: US 10,484,227 B2
(45) Date of Patent: Nov. 19, 2019

(54) SYNCHRONIZATION APPARATUS, SYNCHRONIZATION METHOD FOR SYNCHRONIZING TIMING

(71) Applicant: JVC KENWOOD Corporation, Yokohama-shi, Kanagawa (JP)

(72) Inventor: Masayuki Tsuchida, Yokohama (JP)

(73) Assignee: JVC KENWOOD CORPORATION, Yokohama-Shi (JP)

( * ) Notice: Subject to any disclaimer, the term of this patent is extended or adjusted under 35 U.S.C. 154(b) by 0 days.

(21) Appl. No.: 16/041,865

(22) Filed: Jul. 23, 2018

(65) Prior Publication Data
US 2019/0097860 A1    Mar. 28, 2019

(30) Foreign Application Priority Data
Sep. 27, 2017  (JP) .................................. 2017-186049

(51) Int. Cl.
*H04B 1/7083*     (2011.01)
*H04L 27/26*      (2006.01)
*H04L 7/04*       (2006.01)
*H04L 5/00*       (2006.01)

(52) U.S. Cl.
CPC ............ *H04L 27/2663* (2013.01); *H04L 7/04* (2013.01); *H04L 27/2692* (2013.01); *H04B 1/7083* (2013.01); *H04L 5/0048* (2013.01); *H04L 27/2656* (2013.01); *H04L 27/2675* (2013.01)

(58) Field of Classification Search
USPC ................................. 375/260; 370/350, 208
See application file for complete search history.

(56) References Cited

U.S. PATENT DOCUMENTS

| 7,991,296 B1* | 8/2011 | Johnston | H04J 3/0608 398/154 |
| 2005/0168382 A1* | 8/2005 | Awata | G01S 19/29 342/357.68 |
| 2006/0126491 A1* | 6/2006 | Ro | H04L 27/2647 370/208 |
| 2007/0201349 A1* | 8/2007 | McCoy | H04L 27/2665 370/208 |

(Continued)

FOREIGN PATENT DOCUMENTS

JP    2011-40847 A    2/2011

*Primary Examiner* — Eva Y Puente
(74) *Attorney, Agent, or Firm* — Brundidge & Stanger, P.C.

(57) ABSTRACT

A correlation processor derives a correlation value indicating correlation between each of a plurality of reference signals produced by extracting symbols from the synchronization signal of each pattern at a predetermined interval and a received signal. A controller compares the correlation value for each pattern and for each sample derived by the correlation processor with a threshold value and, when at least one correlation value is larger than the threshold value, changes symbols extracted to produce respective reference signals before causing the correlation processor to perform the same process, incorporating the received signal newly acquired. A first selector selects one of the plurality of patterns when all symbols of the synchronization signal have been extracted to produce the reference signals and at least one correlation value is larger than the threshold value.

4 Claims, 8 Drawing Sheets

(56) References Cited

U.S. PATENT DOCUMENTS

2010/0172341 A1\* 7/2010 Park ................... H04L 5/0007
 370/350
2011/0026617 A1\* 2/2011 Lee .................... H04L 27/2607
 375/260

\* cited by examiner

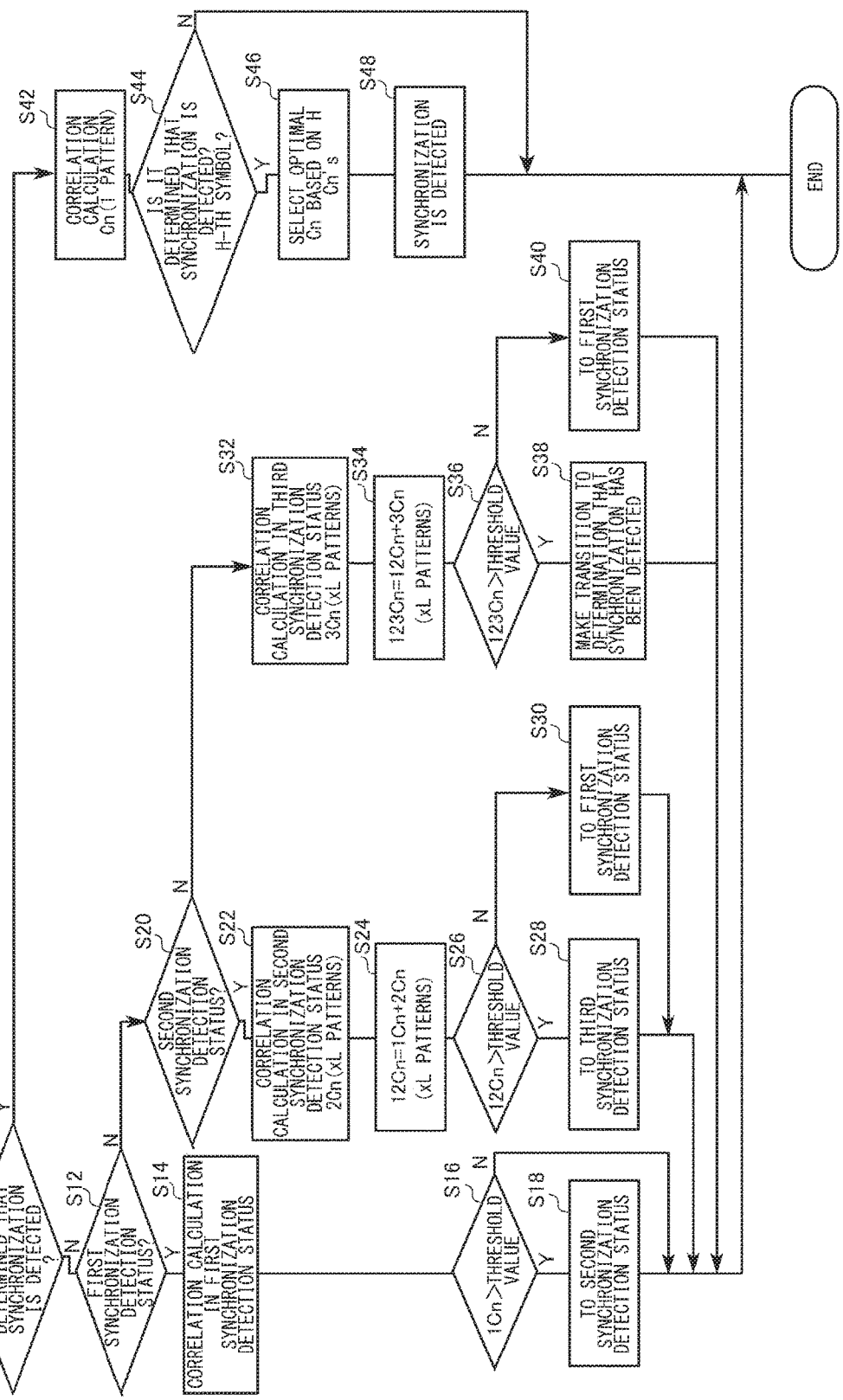

SYNCHRONIZATION APPARATUS, SYNCHRONIZATION METHOD FOR SYNCHRONIZING TIMING

CROSS-REFERENCE TO RELATED APPLICATION

This application is based upon and claims the benefit of priority from the prior Japanese Patent Application No.2017-186049, filed on Sep. 27, 2017, the entire contents of which is incorporated herein by reference.

BACKGROUND

1. Field

The present invention relates to synchronization technologies and, more particularly, to a synchronization apparatus and a synchronization method for synchronizing the timing.

2. Description of the Related Art

In a receiving apparatus for wireless communication such as business wireless system, a synchronization process for detecting a frame synchronization word from a baseband signal is performed. More specifically, the synchronization timing is detected based on waveform correlation. To increase the precision of detection of the synchronization timing, one symbol is sampled at a plurality of sampling points (see, for example, patent document 1).

[patent document 1] JP2011-40847

By sampling one symbol by using a plurality samples, the processing volume for the correlation process is increased. Where a plurality of types of synchronization words are defined, the correction process for the respective synchronization words will be necessary, further increasing the processing volume. Meanwhile, it is desired not to lower the precision of detection of the synchronization timing by reducing the processing volume.

SUMMARY

A synchronization apparatus according to one embodiment comprises: an acquisition unit that acquires a received signal, a plurality of patterns of synchronization signals each comprised of a plurality of symbols being defined, the received signal including the synchronization signal of one of the plurality of patterns, and the received signal being sampled by using a plurality of samples per one symbol; a correlation processor that derives a correlation value indicating correlation between each of a plurality of reference signals produced by extracting symbols from the synchronization signal of each pattern at a predetermined interval and the received signal acquired by the acquisition unit; a controller that compares the correlation value for each pattern and for each sample derived by the correlation processor with a threshold value and that, (1) when all correlation values are equal to or less than the threshold value, causes the correlation processor to perform the same process, incorporating the received signal newly acquired by the acquisition unit, and that (2) when at least one correlation value is larger than the threshold value, changes symbols extracted to produce respective reference signals before causing the correlation processor to perform the same process, incorporating the received signal newly acquired by the acquisition unit; a first selector that selects one of the plurality of patterns when all symbols of the synchronization signal have been extracted to produce the reference signals and at least one correlation value is larger than the threshold value; and a second selector that derives for each sample the correlation value indicating correlation between the synchronization signal of the pattern selected by the first selector and the received signal newly acquired by the acquisition unit and selects a timing of sampling based on the derived correlation value.

A synchronization apparatus according to another embodiment subjects one of received signals to synchronization detection, a plurality of patterns of synchronization signals each comprised of a plurality of symbols being defined in the received signals, wherein the number of symbols detected per one pattern of synchronization signal is defined to be a predetermined number determined by the number of patterns of synchronization signals, and one of the plurality of patterns defined is extracted at the timing of each symbol.

Another embodiment relates to a synchronization method. The method comprises: acquiring a received signal, a plurality of patterns of synchronization signals each comprised of a plurality of symbols being defined, the received signal including the synchronization signal of one of the plurality of patterns, and the received signal being sampled by using a plurality of samples per one symbol; deriving a correlation value indicating correlation between each of a plurality of reference signals produced by extracting symbols from the synchronization signal of each pattern at a predetermined interval and the received signal acquired; comparing the correlation value for each pattern and for each sample derived with a threshold value and (1) when all correlation values are equal to or less than the threshold value, causing the deriving to to perform the same process, incorporating the received signal newly acquired, and (2) when at least one correlation value is larger than the threshold value, changing symbols extracted to produce respective reference signals before causing the deriving to perform the same process, incorporating the received signal newly acquired; selecting one of the plurality of patterns when all symbols of the synchronization signal have been extracted to produce the reference signals and at least one correlation value is larger than the threshold value; and deriving for each sample the correlation value indicating correlation between the synchronization signal of the pattern selected and the received signal newly acquired and selecting a timing of sampling based on the derived correlation value.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8 is a flowchart showing steps for synchronization by the synchronizer of FIG. 4.

DETAILED DESCRIPTION

Figure 1:
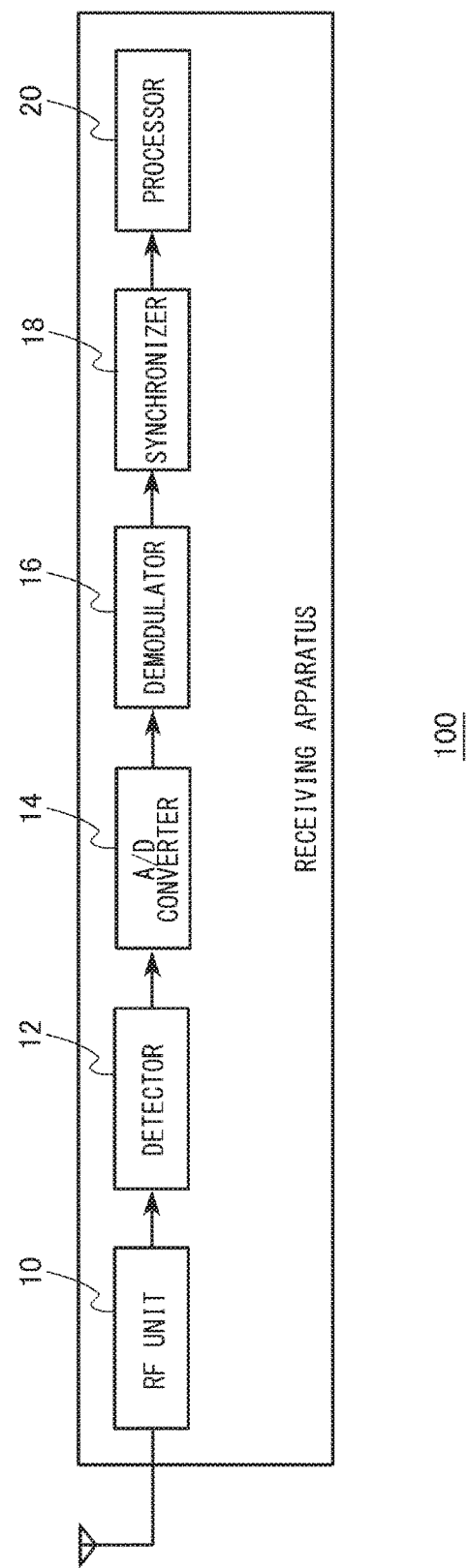
FIG. 1 shows a configuration of a receiving apparatus according to the embodiment.

The invention will now be described by reference to the preferred embodiments. This does not intend to limit the scope of the present invention, but to exemplify the invention.

A summary of the prevent invention will be given before describing the invention in specific detail. The embodiment relates to a synchronizer included in a receiving apparatus of a digital wireless device in a wireless communication system such as Land Mobile Radio (LMR) and a business wireless system. The receiving apparatus generates a baseband signal by demodulating the frame data received. The synchronizer uses the synchronization signal included in the demodulated baseband signal to perform a synchronization detection process. The synchronization detection process establishes frame/symbol synchronization. For this purpose, the frame data includes a synchronization signal. For example, a correlation value indicating correlation with the synchronization signal is calculated for each symbol of the baseband signal. When the correlation value is larger than a threshold value, establishment of synchronization is detected. This determines the symbol timing and symbols of the data that follows the synchronization signal are extracted. It will be assumed here that the number of samples per symbol of the baseband signal is N per one symbol. Given that the number of symbols of the synchronization signal is M (M symbols), N×M correlation calculations will be required in terms of the symbol. Further, a plurality of patterns of synchronization signals may be defined. Given that the number of patterns of the synchronization signals is L, L×N×M correlation calculations will be necessary. An increase in the processing volume like this increases the standby power consumption. Meanwhile, reduction in the standby power consumption is called for.

In this background, reduction in the processing volume for correlation calculation in the synchronizer in a standby operation is called for. The synchronization apparatus according to the embodiment divides a synchronization signal of each pattern into a plurality of signals to calculate correlation. Further, the synchronization signal calculates correlation for each pattern using divided synchronization signals. When the correlation value is larger than a threshold value, the synchronization apparatus continues to calculate correlation for the next symbol of the synchronization signal, using divided synchronization signals. The process is repeated when the correlation value is larger than the threshold value. Further, the synchronization apparatus integrates (accumulates) the correlation values for each divided synchronization signal and detects synchronization based on the result of correlation calculation of the most recently divided synchronization signal. Meanwhile, when the correlation value becomes equal to or less than the threshold value, the synchronization apparatus returns to the correlation calculation of the initially divided synchronization signal. The number of patterns of synchronization signals for a simultaneous standby operation controls the number of divisions of the synchronization signal. This ensures that the same processing volume as consumed for the pattern of synchronization signal for a single standby operation is consumed regardless of the number of patterns of synchronization signals for a simultaneous standby operation.

FIG. 1 shows a configuration of a receiving apparatus 100 according to the embodiment. The receiving apparatus 100 includes an RF unit 10, a detector 12, an A/D converter 14, a demodulator 16, a synchronizer 18, and a processor 20. The RF unit 10 receives radio waves received in the antenna as an RF signal. The RF unit 10 amplifies the RF signal by means of a high-frequency amplifier. Further, the RF unit 10 generates an intermediate frequency (IF) signal by mixing a local oscillation signal from a local oscillator and the amplified RF signal in a mixer. The RF unit 10 amplifies the IF signal by means of an intermediate frequency amplifier before outputting the IF signal to the detector 12.

The detector 12 receives the IF signal from the RF unit 10 and generates the baseband signal by subjecting the IF signal to detection. A direct conversion scheme, in which the RF unit 10 directly converts the RF signal to generate the baseband signal, may be employed. The band of the baseband signal is limited by a band limiter. The A/D converter 14 receives the baseband signal from the detector 12 and converts the baseband signal from an analog signal into a digital signal. The baseband signal converted into a digital signal (hereinafter, also referred to as "baseband signal") contains modulated components. The demodulator 16 receives the baseband signal from the detector 12 and demodulates the baseband signal by using a modulation index regulation signal. The demodulator 16 outputs the demodulated baseband signal (also referred to as "baseband signal") to the synchronizer 18.

Figure 2:
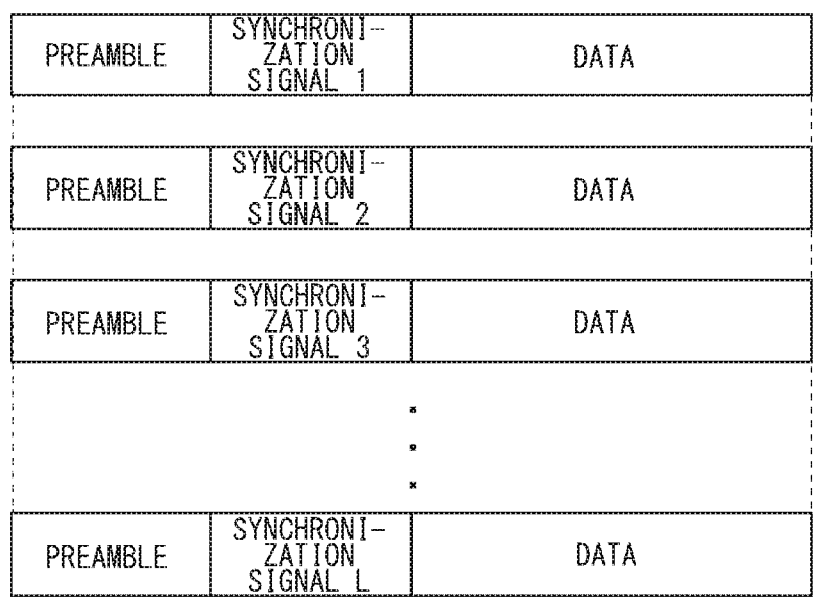
FIG. 2 shows a format of frames received in the receiving apparatus of FIG. 1.

The synchronizer 18 receives the baseband signal from the detector 12 and subjects the baseband signal to frame/symbol synchronization. The detail of the process in the synchronizer 18 will be described later. The processor 20 processes data for which synchronization has been established in the synchronizer 18. FIG. 2 shows a format of frames received in the receiving apparatus 100. As shown in the figure, the preamble, the synchronization signal (1, 2, 3 ... L), and the data are arranged in the stated order. The preamble is a signal of a predefined pattern. For example, the preamble is used to detect the RF signal or to set the gain. The synchronization signal is a signal used in the process in the synchronizer 18 and is comprised of a plurality of symbols. Further, a plurality of patterns of synchronization signals are defined. The synchronization signal of one of the plurality of patterns is included in a frame.

Figure 3:
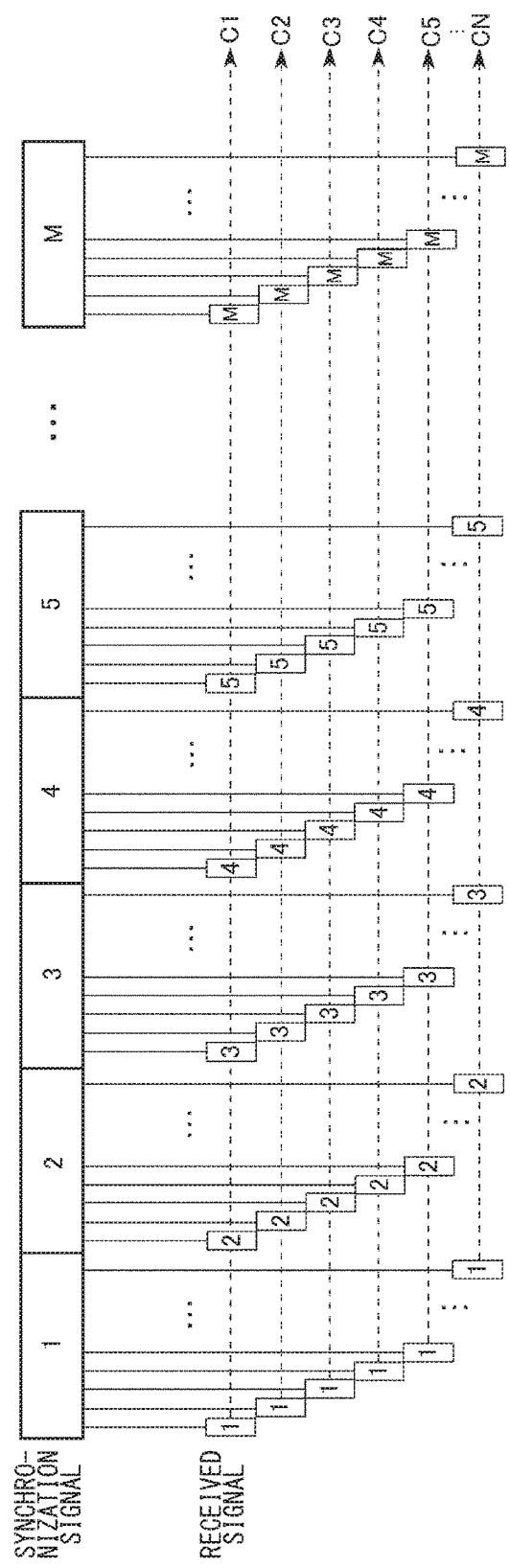
FIG. 3 shows a summary of a process in the synchronizer, showing the subjects of comparison in the synchronizer of FIG. 1.

FIG. 3 shows a summary of a process in the synchronizer, showing the subjects of comparison in the synchronizer 18. It will be assumed here that the number of samples in one symbol interval is denoted by "N", and the number of symbols of the synchronization signal is denoted by "M", and the baseband signal processed is denoted by "Rnm". Therefore, the symbol positions of the synchronization signal are denoted by m=1, 2, ..., M. The sample positions of the symbol are denoted by n=1, 2, ..., N, and the value of symbol m of the synchronization signal is denoted by SNCm. The correlation value Cn for each sample illustrated is as given below.

$$Cn = \Sigma Rnm \times SYNCm$$

When there are a plurality of (e.g., L) patterns of synchronization signals for a simultaneous standby operation, it is necessary to repeat the correlation calculation shown in FIG. 3 L times for each symbol interval. When the correlation value becomes larger than the threshold value for each pattern, the synchronization detection condition is met, and the pattern of synchronization signal is selected. Subsequently, by repeating the correlation calculation for the selected pattern over, for example, H symbol intervals, the maximum correlation value in the H symbol intervals is selected, and the associated symbol timing is determined to be the optimal timing.

The processing volume in this process is given by L×M×N+M×N×(H−1). In particular, the processing volume in the standby operation is given by L×M×N. For example, given that the number of patterns of synchronization signals for the standby operation is "3", the number of symbols of the synchronization signal is "24", the number of samples in the symbol interval is "10", and the number of symbols processed after the synchronization detection condition is met is "3", the processing volume is as given below.

$$3\times24\times10+24\times10\times2=1200$$

The processing volume in the standby operation is given by 3×24×10=720.

As mentioned before, reduction in the processing volume is called for.

Figure 4:
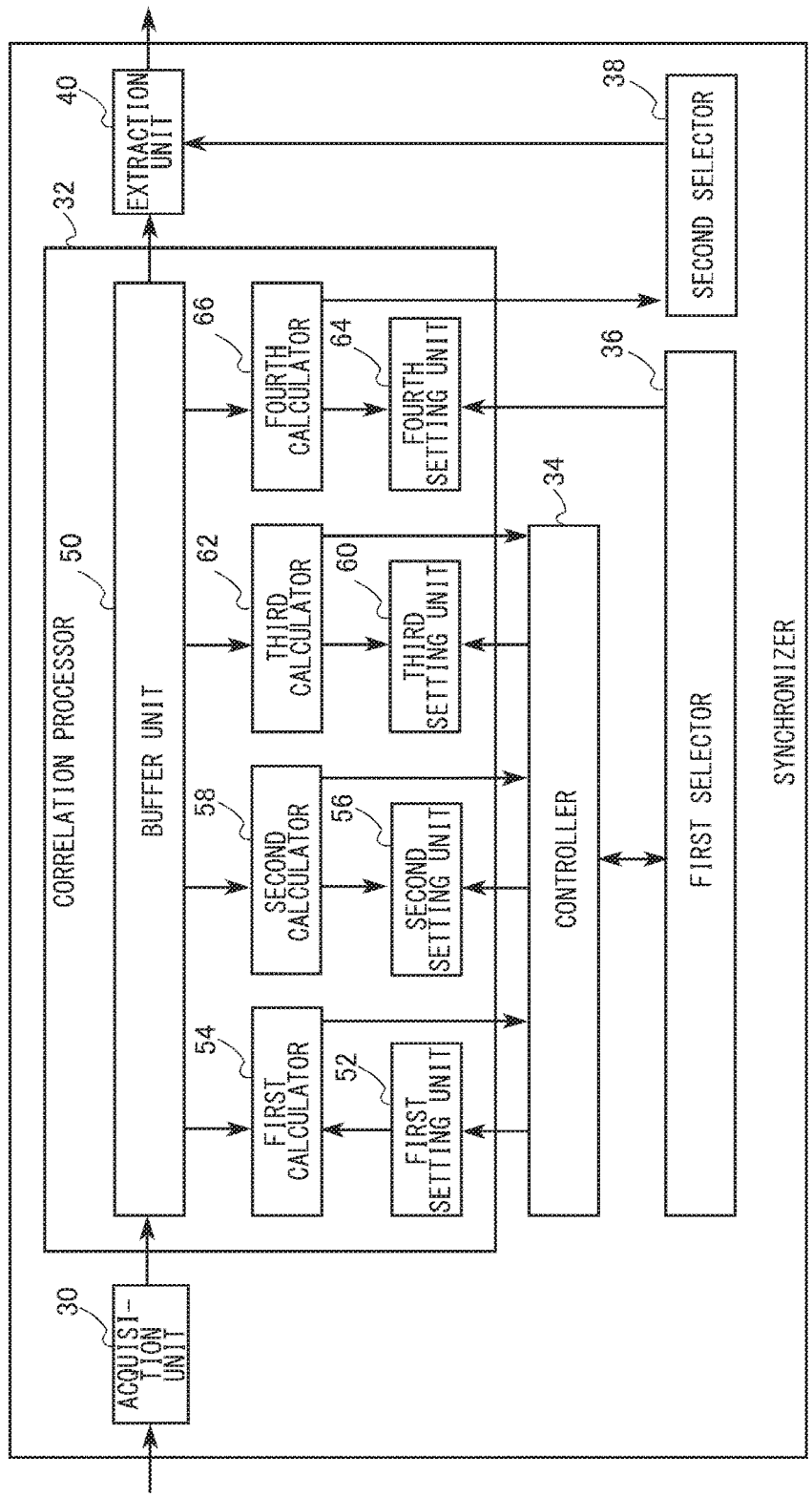
FIG. 4 shows a configuration of the synchronizer of FIG. 1.

FIG. 4 shows a configuration of the synchronizer 18. The synchronizer 18 incudes an acquisition unit 30, a correlation processor 32, a controller 34, a first selector 36, a second selector 38, and an extraction unit 40. The correlation processor 32 includes a buffer unit 50, a first setting unit 52, a first calculator 54, a second setting unit 56, a second calculator 58, a third setting unit 60, a third calculator 62, a fourth setting unit 64, and a fourth calculator 66. The acquisition unit 30 acquires the baseband signal from the demodulator 16 (not shown). The baseband signal represents the received signal. As described previously, the baseband signal is sampled by using a plurality of samples per symbol. The frame format of the baseband signal is as shown in FIG. 2. The synchronization signal of one of the L patterns defined is included in a frame. In the following description, L is assumed to be "3". The buffer unit 50 sequentially stores the baseband signal acquired by the acquisition unit 30. The buffer unit 50 stores the baseband signal for a predetermined period of time and then sequentially outputs the baseband signal to the extraction unit 40 on the first-in-first-out basis.

The correlation processor 32 derives, for each sample, a correlation value indicating correlation between i) each of a plurality of reference signals produced by extracting symbols from the synchronization signal of each pattern at a predetermined interval, and ii) the baseband signal acquired by the acquisition unit 30. The first setting unit 52 stores a plurality of reference signals produced by extracting symbols from the synchronization signal of each pattern at a predetermined interval (e.g., "3"). More specifically, a reference signal produced by extracting every third symbol is stored, starting with the first symbol of the synchronization signal. This is equivalent to extracting symbols from the synchronization signal at the interval of L-1 symbols. Since three patterns of synchronization signals are defined, the number of reference signals is also three.

Figure 5:
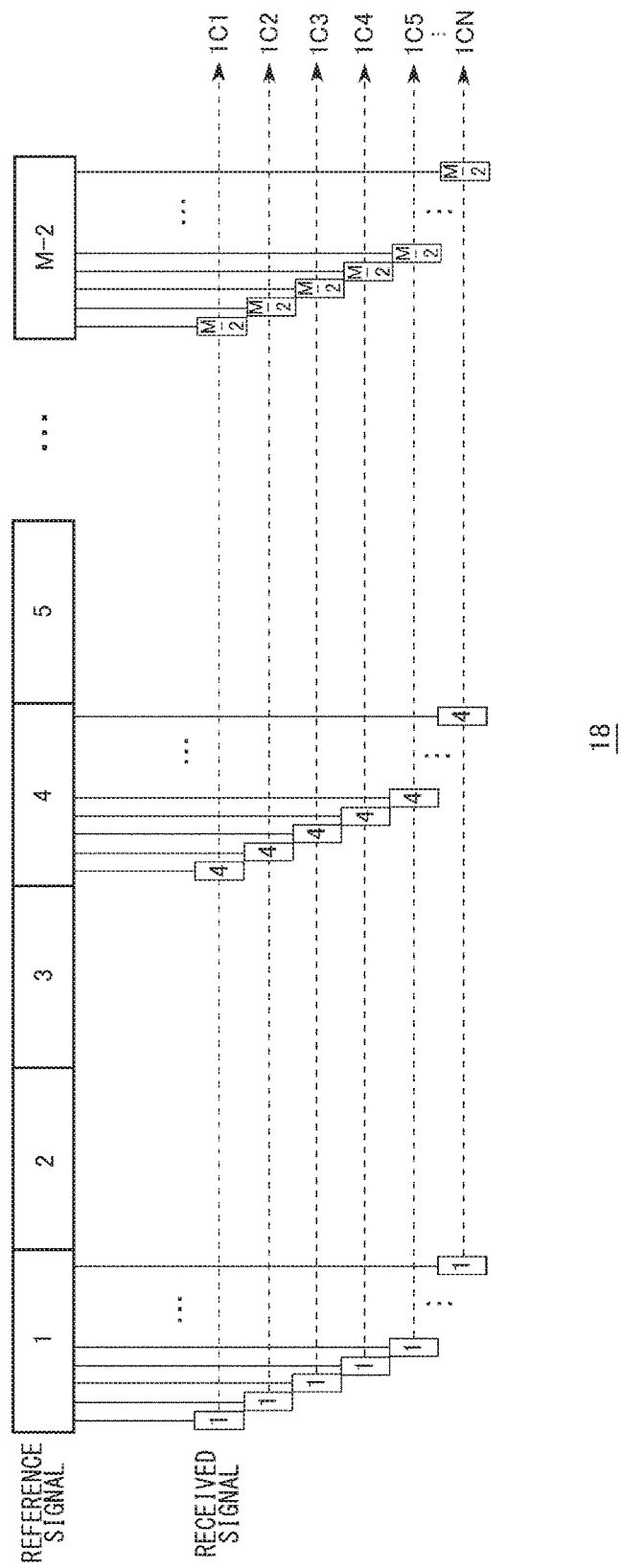
FIG. 5 shows a summary of a process in the synchronizer of FIG. 4.

The first calculator 54 calculates a correlation value indicating correlation between the baseband signal and each of the plurality of reference signals stored in the first setting unit 52. This process will also be referred to as the first synchronization detection status. FIG. 5 shows a summary of a process in the synchronizer 18. The figure shows a process for one pattern. The other patterns will be processed similarly. The reference signals include values of the first symbol, fourth symbol, ... M−2-th symbol of the synchronization signal. The symbol positions of the reference signals are denoted by m1=1, 4, ..., M−2. The value of symbol m1 of the reference signals is denoted by SYNCm1. The correlation value 1Cn of the first synchronization detection status is as given below.

$$1Cn=\Sigma Rnm1\times SYNCm1$$

The correlation value of the first synchronization detection status derived for respective samples are denoted by 1C1, 1C2, ..., 1CN. Reference is made back to FIG. 4.

The controller 34 compares the correlation value for each pattern and for each sample derived by the first calculator 54 with the threshold value. When all correlation values are equal to or less than the threshold value, the controller 34 causes the first calculator 54 to perform the same process, incorporating the baseband signal newly acquired by the acquisition unit 30. Meanwhile, when at least one correlation value is larger than the threshold value, the controller 34 causes the second setting unit 56 to perform the process. This is equivalent to making a transition from the first synchronization detection status to the second synchronization detection status. The second setting unit 56 stores a plurality of reference signals produced by extracting the symbol next to the symbol extracted by the first setting unit 52. More specifically, reference signals produced by extracting every third symbol, starting with the second symbol of the synchronization signal, are stored. The number of reference signals is three in this case as well.

Figure 6:
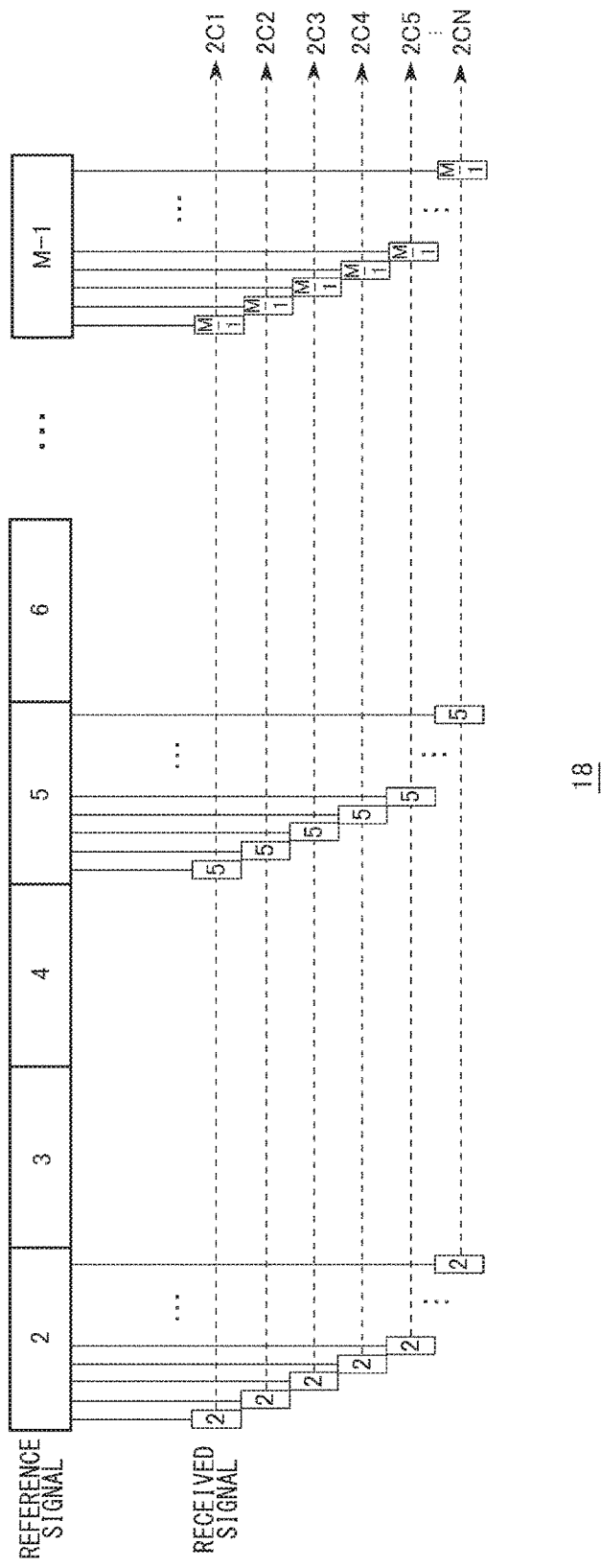
FIG. 6 shows a summary of another process in the synchronizer of FIG. 4.

The second calculator 58 calculates correlation values indicating correlation between the base band signal and each of the plurality of reference signals stored in the second setting unit 56. This process will also be referred to as the second synchronization detection status. FIG. 6 shows a summary of another process in the synchronizer 18. The figure shows a process for one pattern. The other patterns will be processed similarly. The reference signals include values of the second symbol, fifth symbol, ... M−1-th symbol of the synchronization signal. The symbol positions of the reference signals are denoted by m2=1, 4, ..., M−1. The value of symbol m2 of the reference signals is denoted by SYNCm2. The correlation value 2Cn of the second synchronization detection status is as given below.

$$2Cn=\Sigma Rnm2\times SYNCm2$$

The correlation value of the second synchronization detection status derived for respective samples are denoted by 2C1, 2C2, ..., 2CN. In other words, the controller 34 changes symbols extracted to produce respective reference signals before causing the correlation processor 32 to perform the same process, incorporating the baseband signal newly acquired by the acquisition unit 30. Reference is made back to FIG. 4.

The controller 34 generates, for a given pattern, a correlation value 12Cn by adding sample by sample the correlation value 1Cn of the first synchronization detection status one symbol earlier and the correlation value 2Cn of the second synchronization detection status. The controller 34 compares the correlation value 12Cn for each pattern and for each sample with the threshold value. When all correlation values are equal to or less than the threshold value, the controller 34 causes the first calculator 54 to perform the same process, incorporating the baseband signal newly acquired by the acquisition unit 30. In other words, the controller 34 returns the second synchronization detection status to the first synchronization detection status. Meanwhile, when at least one correlation value is larger than the threshold value, the controller 34 causes the third setting unit 60 to perform the process. This is equivalent to making a transition from the second synchronization detection status to the third synchronization detection status. The third setting unit 60 stores a plurality of reference signals produced by extracting the symbol next to the symbol extracted by the second setting unit 56. More specifically, reference signals produced by extracting every third symbol, starting with the third symbol of the synchronization signal, are stored. The number of reference signals is three in this case as well.

Figure 7:
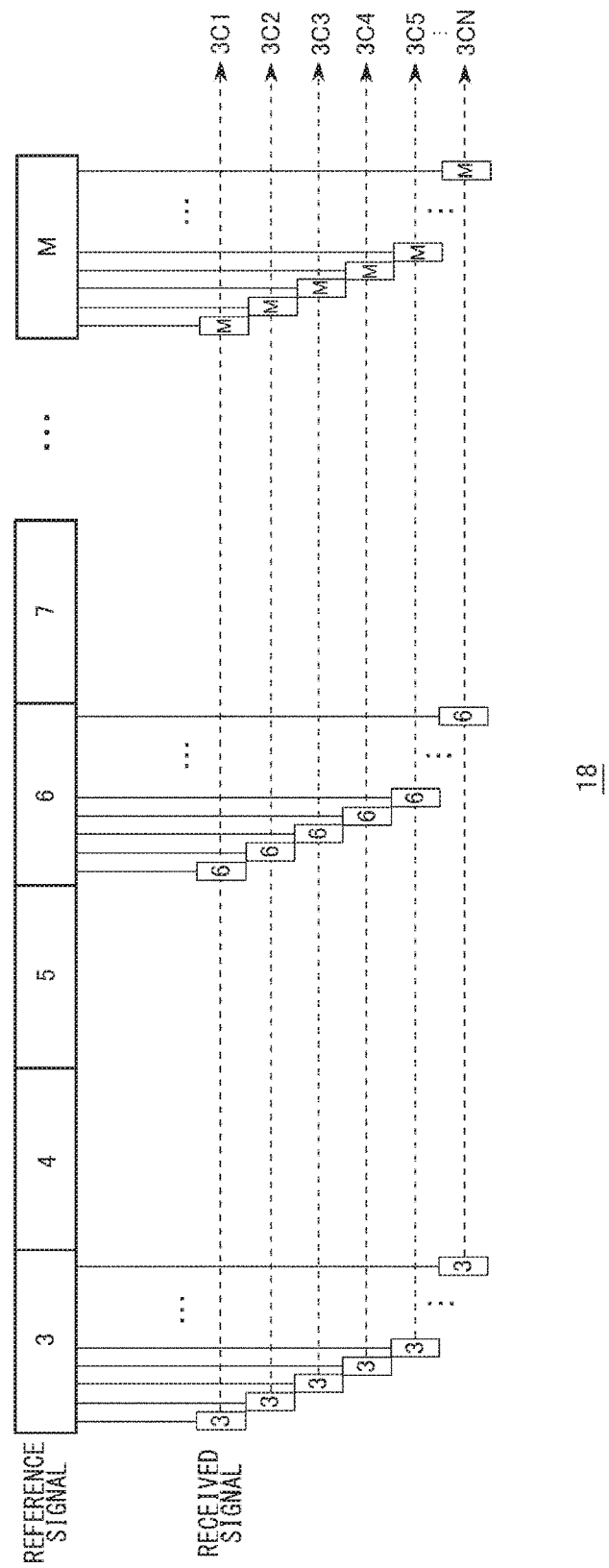
FIG. 7 shows a summary of a still another process in the synchronizer of FIG. 4.

The third calculator 62 calculates a correlation value indicating correlation between the baseband signal and each of the plurality of reference signals stored in the third setting unit 60. This process will also be referred to as the third synchronization detection status. FIG. 7 shows a summary of a still another process in the synchronizer 18. The figure shows a process for one pattern. The other patterns will be processed similarly. The reference signals include values of the third symbol, sixth symbol, . . . M-th symbol of the synchronization signal. The symbol positions of the reference signals are denoted by m3=3, 6, . . . , M. The value of symbol m3 of the reference signals is denoted by SYNCm3. The correlation value 3Cn of the third synchronization detection status is as given below.

$$3Cn = \Sigma Rnm3 \times SYNCm3$$

The correlation value of the third synchronization detection status derived for respective samples are denoted by 3C1, 3C2, . . . , 3CN. In this case as well, the controller 34 changes symbols extracted to produce respective reference signals before causing the correlation processor 32 to perform the same process, incorporating the baseband signal newly acquired by the acquisition unit 30. Reference is made back to FIG. 4.

The controller 34 generates, for a given pattern, a correlation value 123Cn by adding sample by sample the correlation value 12Cn generated already and the correlation value 3Cn of the third synchronization detection status. The controller 34 outputs the correlation value 123Cn for each pattern and for each sample to the first selector 36. The first selector 36 compares the correlation value 123Cn for each pattern and for each sample with the threshold value. When all correlation values are equal to or less than the threshold value, the first selector 36 causes the first calculator 54 to perform the same process via the controller 34. In other words, the first selector 36 returns the third synchronization detection status to the first synchronization detection status. Meanwhile, when at least one correlation value is larger than the threshold value, the first selector 36 selects the pattern associated with the largest correlation value. This is equivalent to selecting one of the plurality of patterns when all symbols of the synchronization signal have been extracted to produce the reference signals and at least one correlation value is larger than the threshold value.

The first selector 36 causes the fourth setting unit 64 to set the synchronization signal of the selected pattern. The fourth calculator 66 calculates a correlation value indicating correlation between the baseband signal and the synchronization signal set by the fourth setting unit 64. The calculation of the correlation value like this is repeated over, for example, H symbols (e.g., "three" symbols). The correlation value may be calculated as described already so that a description is not duplicated. For clarity of the explanation, the first calculator 54, the second calculator 58, the third calculator 62, and the fourth calculator 66 are illustrated as being separate. However, a common computation circuit may be used.

The second selector 38 selects the largest of the correlation values calculated by the fourth calculator 66 and identifies the timing of sampling associated with the largest correlation value. In essence, the second selector 38 derives for each sample the correlation value indicating correlation between the synchronization signal of the pattern selected by the first selector 36 and the baseband signal newly acquired by the acquisition unit 30. The second selector 38 selects the timing of sampling based on the derived correlation value. The second selector 38 communicates the selected timing of sampling to the extraction unit 40. The extraction unit 40 refers to the baseband signal acquired from the buffer unit 50 and extracts the symbol concurrent with the timing of sampling communicated from the second selector 38.

The processing volume in this process is given by $(L \times M \times N)/3 + M \times N \times (H-1)$. In particular, the processing volume in the standby operation is given by $(L \times M \times N)/3$. For example, given that the number of patterns of synchronization signals for the standby operation is "3", the number of symbols of the synchronization signal is "24", the number of samples in the symbol interval is "10", and the number of symbols processed after the synchronization detection condition is met is "3", the processing volume is as given below.

$$3/3 \times 24 \times 10 + 24 \times 10 \times 2 = 720$$

The processing volume during the standby operation is given by $3/3 \times 24 \times 10 = 240$.

The process is described above as being divided, given the three patterns, into three sub-processes from the first synchronization detection status through the third synchronization detection status. Meanwhile, the number of divisions may be changed depending on the number of patterns. Where the number of patterns is L, the number of symbols of the synchronization signal/L is defined as the number "J" of divisions for detection and correlation. In this case, the reference signals will include symbols extracted at the interval of J-1.

The processing volume in the standby operation consumed when the number of symbols of the synchronization signal is "24" is as given below. When the number of patterns is "1", there is no division, and the processing volume is given by $(1 \times 24 \times 10) = 240$. When the number of patterns is "2", the number of divisions is 2, the number of symbols detected per one pattern is 24/2=12, and the processing volume is given by $2 \times 24/2 \times 10 = 240$. When the number of patterns is "3", the number of divisions is 3, the number of symbols detected per one pattern is 24/3=8, and the processing volume is given by $3 \times 24/3 \times 10 = 240$. When the number of patterns is "4", the number of divisions is 4, the number of symbols detected per one pattern is 24/4=6, and the processing volume is given by $4 \times 24/4 \times 10 = 240$. The processing volumes are identical regardless of the number of patterns. So long as the pattern is one of the defined patterns, any position in the 24 symbols may be detected.

In essence, the received signal in which the synchronization signal is defined in a plurality of patterns is subject to synchronization detection such that the number of symbols detected per one pattern of synchronization signal is defined to be a predetermined number determined by the number of patterns of synchronization signals defined. Further, the pattern detected at the timing of each symbol may any one of the plurality of patterns defined. For example, symbols for detection may be sequenced depending on the pattern, or the number of symbols for detection being weighted according to the priority of the pattern.

The features are implemented in hardware such as a CPU, a memory, or other LSI's, of any computer and in software such as a program loaded into a memory. The figure depicts functional blocks implemented by the cooperation of these elements. Therefore, it will be understood by those skilled in the art that the functional blocks may be implemented in a variety of manners by hardware only, software only, or by a combination of hardware and software.

A description will now be given of the operation of the receiving apparatus 100 having the configuration described above. FIG. 8 is a flowchart showing steps for synchronization by the synchronizer 18. When it is not determined that synchronization has been detected (N in S10), and the process is in the first synchronization detection status (Y in S12), the first setting unit 52 and the first calculator 54 perform the correlation calculation in the first detection status (S14). When 1Cn>threshold value (Y in S16), the controller 34 determines to make a transition to the second synchronization detection status (S18). When 1Cn>threshold value does not hold (N in S16), step 18 is skipped.

When the process is not in the first synchronization detection status (N in S12) and the process is in the second synchronization detection status (Y in S20), the second setting unit 56 and the second calculator 58 perform the correlation calculation in the second detection status (S22). The controller 34 calculates 12Cn=1Cn+2Cn (S24). When 12Cn>threshold value (Y in S26), the controller 34 determines to make a transition to the third synchronization detection status (S28). When 1Cn>threshold value does not hold (N in S26), the controller 34 determines to make a transition to the first synchronization detection status (S30).

When the process is not in the second synchronization detection status (N in S20), the third setting unit 60 and the third calculator 62 perform the correlation calculation in the third detection status (S32). The controller 34 calculates 123Cn=12Cn+3Cn (S34). When 123Cn>threshold value (Y in S36), the first selector 36 determines to make a transition to a determination that synchronization has been detected (S38). When 123Cn>threshold value does not hold (N in S36), the first selector 36 determines to make a transition to the first synchronization detection status (S40).

When it is determined that synchronization has been detected (Y in S10), the fourth setting unit 64 and the fourth calculator 66 perform the correlation calculation (S42). When it is determined that synchronization has been detected and the H-th symbol is being processed (Y in S44), the second selector 38 selects the optimal Cn based on a total of H Cn's (S46). The second selector 38 performs synchronization detection (S48). When it is determined that synchronization has been detected and the H-th symbol is not being processed (N in S44), step 46 and step 48 are skipped.

According to the embodiment, the processing volume is reduced to 1/L during the standby operation, by dividing the synchronization signal into L signals. Since the number of divisions of the synchronization signal is changed depending on the number of patterns of synchronization signals for the simultaneous standby operation, the processing volume remains unchanged regardless of the number of patterns. Since the processing volume remains unchanged, the power consumption is inhibited from being increased. Since the correlation values are integrated, the precision of synchronization detection is maintained even if the processing volume is reduced. Therefore, the processing volume is inhibited from increasing, while also preventing the precision of detection of the synchronization timing from being lowered.

Described above is an explanation based on an exemplary embodiment. The embodiment is intended to be illustrative only and it will be understood by those skilled in the art that various modifications to constituting elements and processes could be developed and that such modifications are also within the scope of the present invention.

In the embodiment, L patterns of synchronization signals are defined. Each of the plurality of reference signals is derived by extracting symbols from the synchronization signal at the interval of L-1 symbols. Alternatively, each of the plurality of reference signals may be derived by extracting symbols from the synchronization signal at the interval of the number of symbols equal to larger than L. In this case, the correlation processor 32 provides a priority level to each of the plurality of patterns. The correlation value indicating correlation between the synchronization signal of a pattern with a high priority level and each of a plurality of types of reference signals, in which extracted symbols are changed, is derived. For example, one pattern may be prioritized over the other patterns. It is assumed here that the number of symbols of the synchronization signal is "24". When the number of patterns is "1", there is no division and the processing volume is given by (1×24×10)=240.

When the number of patterns is two, the number of divisions is three. Two symbols are used for the one pattern, and one symbol is used for the other pattern. In this case, the processing volume is given by ((2×24/3)+(1×24/3))×10=240. When the number of patterns is three, the number of divisions is four. Two symbols are used for the one pattern, and one symbol is used for each of the other two patterns. In this case, the processing volume is given by ((2×24/4)+(1×24/4))+(1×24/4)×10=240. When the patterns are denoted by A, B, and C, the sequence of symbols may be either A(1)A(2)B(1)C(1) or A(1)B(1)A(2)C(1). According to this variation, the process can be terminated earlier for the pattern with a high priority level.

What is claimed is:

1. A synchronization apparatus comprising:
an acquisition unit that acquires a received signal, and a plurality of patterns of synchronization signals each comprised of a plurality of symbols being defined,
wherein the received signal includes a synchronization signal of one of the plurality of patterns of the synchronization signals, and
wherein the received signal is sampled by using a plurality of samples per one symbol;
a correlation processor that derives a correlation value indicating correlation between each of a plurality of reference signals produced by extracting symbols from the synchronization signal of each pattern at a predetermined interval and the received signal acquired by the acquisition unit;
a controller that compares the correlation value for each pattern and for each sample derived by the correlation processor with a threshold value and that, (1) when all correlation values are equal to or less than the threshold value, causes the correlation processor to perform a same process, incorporating the received signal newly acquired by the acquisition unit, and that (2) when at least one correlation value is larger than the threshold value, changes the symbols extracted to produce respective reference signals before causing the correlation processor to perform the same process, incorporating the received signal newly acquired by the acquisition unit;
a first selector that selects one of the plurality of patterns of the synchronization signals when all symbols of the synchronization signal have been extracted to produce the reference signals and at least one correlation value is larger than the threshold value; and a second selector that derives for each sample the correlation value indicating correlation between the synchronization signal of the pattern selected by the first selector and the received signal newly acquired by the acquisition unit and selects a timing of sampling based on the derived correlation value.

2. The synchronization apparatus according to claim 1, wherein
an L pattern of the synchronization signal is defined, and the symbols are extracted from the synchronization signal at an interval of L-1 symbols.

3. The synchronization apparatus according to claim 1, wherein
an L pattern of the synchronization signal is defined, and the symbols are extracted from the synchronization signal at an interval of a number of the symbols equal to or larger than L, and
a priority level is provided to each of the L patterns, and the number of extracted symbols is changed for the synchronization signal of a high priority level.

4. A synchronization method comprising:
acquiring a received signal, and a plurality of patterns of synchronization signals each comprised of a plurality of symbols being defined,
wherein the received signal includes a synchronization signal of one of the plurality of patterns of the patterns of synchronization signals, and
wherein the received signal is sampled by using a plurality of samples per one symbol;
deriving a correlation value indicating correlation between each of a plurality of reference signals produced by extracting symbols from the synchronization signal of each pattern at a predetermined interval and the received signal acquired;
comparing the correlation value for each pattern and for each sample derived with a threshold value and (1) when all correlation values are equal to or less than the threshold value, causing the deriving to perform a same process, incorporating the received signal newly acquired, and (2) when at least one correlation value is larger than the threshold value, changing symbols extracted to produce respective reference signals before causing the deriving to perform the same process, incorporating the received signal newly acquired;
selecting one of the plurality of patterns of the synchronization signals when all symbols of the synchronization signal have been extracted to produce the reference signals and at least one correlation value is larger than the threshold value; and
deriving for each sample the correlation value indicating correlation between the synchronization signal of the pattern selected and the received signal newly acquired and selecting a timing of sampling based on the derived correlation value.

* * * * *